United States Patent
Huber et al.

(10) Patent No.: US 8,302,713 B2
(45) Date of Patent: Nov. 6, 2012

(54) METHOD FOR OPERATING A HYBRID VEHICLE

(75) Inventors: Thomas Huber, Daisbach (DE); Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 950 days.

(21) Appl. No.: 12/280,255

(22) PCT Filed: Feb. 6, 2007

(86) PCT No.: PCT/EP2007/051096
§ 371 (c)(1),
(2), (4) Date: Jan. 16, 2009

(87) PCT Pub. No.: WO2007/099018
PCT Pub. Date: Sep. 7, 2007

(65) Prior Publication Data
US 2009/0218151 A1 Sep. 3, 2009

(30) Foreign Application Priority Data
Feb. 24, 2006 (DE) .......................... 10 2006 008 642

(51) Int. Cl.
*B60W 10/00* (2006.01)
*B60W 20/00* (2006.01)
(52) U.S. Cl. ............ 180/65.265; 180/65.28; 180/65.285
(58) Field of Classification Search ............ 180/65.265, 180/65.275, 65.28, 65.285, 65.31; 477/3, 477/7; 701/22, 36
See application file for complete search history.

(56) References Cited

U.S. PATENT DOCUMENTS

| | | | |
|---|---|---|---|
| 5,791,427 A * | 8/1998 | Yamaguchi | 180/65.235 |
| 6,664,651 B1 * | 12/2003 | Kotre et al. | 290/29 |
| 7,267,191 B2 * | 9/2007 | Xu et al. | 180/65.245 |
| 7,273,439 B2 * | 9/2007 | Kuang et al. | 477/3 |
| 7,347,116 B2 * | 3/2008 | Sakamoto et al. | 74/329 |
| 7,370,715 B2 * | 5/2008 | Colvin et al. | 180/65.28 |
| 7,386,379 B2 * | 6/2008 | Naik et al. | 701/41 |
| 7,578,364 B2 * | 8/2009 | Ohno | 180/65.28 |
| 7,795,838 B2 * | 9/2010 | Singarajan et al. | 320/104 |
| 7,828,693 B2 * | 11/2010 | Soliman et al. | 477/3 |
| 7,841,433 B2 * | 11/2010 | Soliman et al. | 180/65.265 |
| 7,896,114 B2 * | 3/2011 | Colvin et al. | 180/65.28 |
| 7,953,539 B2 * | 5/2011 | Matthews | 701/101 |

(Continued)

FOREIGN PATENT DOCUMENTS
DE 102 03 760 8/2003
(Continued)

OTHER PUBLICATIONS
International Search Report, PCT/EP2007/051096, dated Oct. 25, 2007.

*Primary Examiner* — Hau Phan
*Assistant Examiner* — Jacob Meyer
(74) *Attorney, Agent, or Firm* — Kenyon & Kenyon LLP

(57) ABSTRACT

A method is for operating a vehicle having a hybrid drive, in which the hybrid drive has an internal combustion engine and at least one electric motor as drive units, and the units cooperate with one another. To achieve a negative drivetrain setpoint torque, the negative drivetrain setpoint torque is applied by the electric motor, and the internal combustion engine is operated to the greatest extent possible outside its overrun mode.

5 Claims, 2 Drawing Sheets

U.S. PATENT DOCUMENTS

| | | | |
|---|---|---|---|
| 7,971,666 B2* | 7/2011 | Yamazaki et al. | 180/65.265 |
| 2002/0063002 A1* | 5/2002 | Lasson | 180/65.3 |
| 2002/0063540 A1* | 5/2002 | Oshima et al. | 318/139 |
| 2003/0191574 A1* | 10/2003 | Kawai et al. | 701/70 |
| 2005/0061564 A1* | 3/2005 | Kuang et al. | 180/65.2 |
| 2005/0072609 A1* | 4/2005 | Eisenhardt et al. | 180/65.3 |
| 2006/0100057 A1* | 5/2006 | Severinsky et al. | 477/4 |

FOREIGN PATENT DOCUMENTS

| | | |
|---|---|---|
| GB | 2 391 325 | 2/2004 |
| JP | 2002 221064 | 8/2002 |
| JP | 2004 60648 | 2/2004 |
| JP | 2004-324424 | 11/2004 |

* cited by examiner

METHOD FOR OPERATING A HYBRID VEHICLE

FIELD OF THE INVENTION

The present invention is directed to a method for operating a hybrid vehicle.

BACKGROUND INFORMATION

Hybrid vehicles are described, for example, in German Published Patent Application No. 102 03 760, which discloses a method for adjusting a setpoint operating state of a hybrid vehicle, in which an internal combustion engine is mechanically coupled to two electric motors.

In such hybrid vehicles, a negative drive torque which is necessary to decelerate the vehicle is generated jointly by an internal combustion engine, one or more electric motors, and possibly a hydraulic brake. The objective is to minimize use of the hydraulic brake, and to provide the main portion of the negative drive torque by combining the internal combustion engine and one or more electric motors. The portion provided by the combination of the internal combustion engine and electric motor(s) is referred to below as the drivetrain torque. The portion provided by the electric motors is used to generate electrical power, which is stored in a battery. In conventional HEVs the fuel injection into the internal combustion engine is also suppressed to conserve fuel (overrun mode). In this case the drag torque of the internal combustion engine contributes to the negative drivetrain torque.

SUMMARY

In the method according to example embodiments of the present invention for operating a vehicle having a hybrid drive, the negative drivetrain setpoint torque is applied by the electric motor, and the internal combustion engine is operated to the greatest extent possible outside its overrun mode to achieve a negative drivetrain setpoint torque. Electrical power may thus be generated in a particularly efficient manner when the vehicle is decelerating.

The overrun mode of the internal combustion engine is avoided whenever possible. This advantageously allows a negative drivetrain torque in a hybrid vehicle to be converted so as to optimize energy, emissions, and comfort. As the result of avoiding overrun mode as well as the change between overrun mode and combustion mode of the internal combustion engine, it is possible to avoid a number of disadvantages, as listed below:

Switching between combustion mode and overrun mode results in a torque jump at the crankshaft of the internal combustion engine. This adversely affects driving comfort.

In overrun mode of an internal combustion engine the intake air passes into the exhaust system. Atmospheric oxygen accumulates in three-way catalytic converters and must be compensated for in the next injections by fuel enrichment in order to avoid unwanted $NO_x$ emissions. In addition, the catalytic converter is cooled by the introduction of intake air.

The exhaust gas enthalpy stream fed to an exhaust gas turbocharger which may be present is smaller in overrun mode of the internal combustion engine than in combustion mode. This degrades the response characteristic of the exhaust gas turbocharger when acceleration is to be performed in overrun mode.

Detachment of the wall film in SRE spark ignition engines in the transition from combustion mode to overrun mode results in increased HC raw emissions on account of incomplete fuel combustion.

Build-up of the wall film in SRE spark ignition engines in the transition from overrun mode to combustion mode results in intermittent increases in fuel consumption. The wall film build-up is accompanied by a less favorable transient response of the lambda pilot control system.

The drag torque of the internal combustion engine which acts on the drivetrain during overrun mode is no longer available to the electric motor(s) for generation of electrical power.

However, if operation in overrun mode is necessary, the internal combustion engine is preferably kept in overrun mode as long as possible to avoid frequent switching between overrun mode and combustion mode. In one advantageous method step, the maximum duration of the overrun mode may be limited by requests from an exhaust gas aftertreatment system, for example to avoid cooling of the catalytic converter.

In a further method step, changes in the delivered torque of the internal combustion engine during the transition from overrun mode to combustion mode are compensated for by a torque of the electric motor. The objective is to compensate, to the greatest extent possible, for changes in the delivered torque of the internal combustion engine during the transition from overrun mode to combustion mode by suitably controlling the effect of the electric motor(s) on the drivetrain torque.

In a further method step, for generation of an overrun request for the internal combustion engine, the requested drivetrain setpoint torque is compared to a scaled, minimum possible electric motor torque.

When the compared value is less than a first threshold, an overrun request is generated. The overrun request is preferably maintained as long as the compared value exceeds a second threshold.

If no overrun request is present, a first setpoint torque may be output to the internal combustion engine from a maximum value selection of a predetermined torque as a function of the requested drivetrain setpoint torque and a minimum possible torque of the internal combustion engine in combustion mode.

If an overrun request is present, a second setpoint torque may be output to the internal combustion engine which corresponds to the drag torque of the internal combustion engine at the instantaneous rotational speed.

The transitions between the first setpoint torque and the second setpoint torque are preferably ramp-shaped.

It is practical to provide compensation in the control system for differing dynamics in the torque controls for the internal combustion engine and the electric motor.

Further features, aspects, and advantages of example embodiments of the present invention are discussed below with reference to the drawings, without limiting the universality.

DETAILED DESCRIPTION

The design and method of operation of a hybrid drive of this type are generally conventional, and therefore are not addressed in further detail in the present description.

Figure 1:
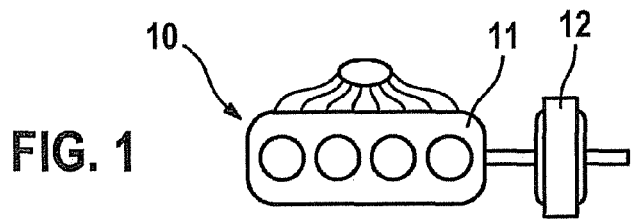
FIG. 1 schematically shows a drivetrain of a parallel hybrid vehicle.

FIG. 1 schematically shows, as an example embodiment of the present invention, a parallel hybrid drivetrain 10 having a described implementation as an internal combustion engine 11 and an electric motor 12.

For drivetrain 10, a drivetrain torque M_drivetrain results from the addition of torque M_ice of internal combustion engine 11 and torque M_mg of electric motor 12, where M_drivetrain =M_ice+M_mg.

The following expression is valid: M_setpoint=M_ice_setpoint+M_mg_setpoint.

For generation of a request for operation of internal combustion engine 11 in overrun mode, requested drivetrain setpoint torque M_setpoint is compared to minimum possible electric motor torque M_mg_min multiplied by an applicable value K_mg. Minimum possible electric motor torque M_mg_min takes into account the operating state of electric motor 12, such as various voltages, various currents, rotational speed, temperature, and/or states of the onboard electrical system and of energy storage, in particular a battery, such as an instantaneous power demand by the electrical consumers, the battery charge state, and the battery temperature.

When the charge state of the battery is low, minimum possible electric motor torque M_mg_min, for example, has a large negative value, thus enabling electric motor 12 in generator mode to generate a high charge power. When the charge state of the battery is high or the battery temperature is disadvantageously high, M_mg_min is increased (in the direction of zero torque), thereby limiting the charge power.

Figure 2:
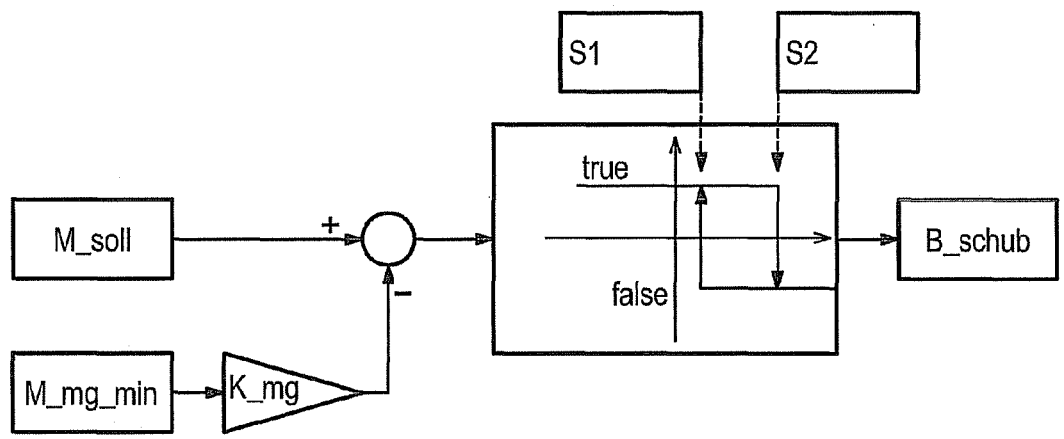
FIG. 2 shows a diagram for generation of an overrun request.

If this difference is less than a threshold value S1, an overrun request B_overrun is generated. This request is maintained as long as the difference to be compared exceeds a threshold value S2. This is illustrated in FIG. 2.

Threshold values threshold S1 and threshold S2 are a function of setpoint torque M_setpoint, the instantaneous rotational speed, the minimum torque of internal combustion engine 11 in combustion mode at the optimal and worst ignition angle efficiency, the drag torque of internal combustion engine 11, the catalytic converter temperature, and the instantaneously delivered torque of internal combustion engine 11. Examples of threshold values are the minimum possible internal combustion engine torque in combustion mode at the worst ignition angle efficiency for threshold S1, and the minimum possible internal combustion engine torque in combustion mode at the optimal ignition angle efficiency for threshold S2.

Figure 3:
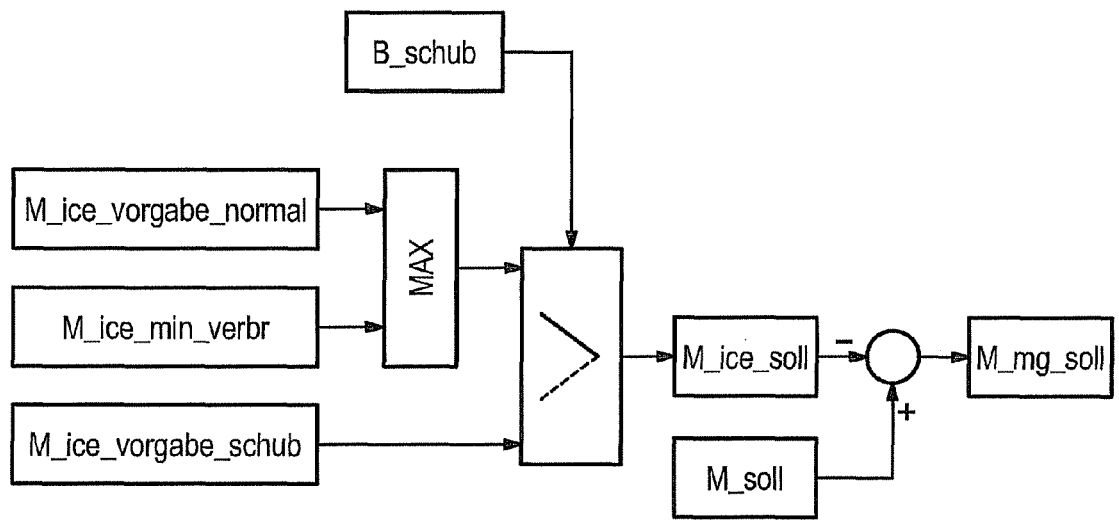
FIG. 3 shows a diagram for carrying out an overrun request.

FIG. 3 illustrates carrying out overrun request B_overrun in setpoint torques for internal combustion engine 11 and electric motor 12. If no overrun request is present, i.e., B_overrun=false, a setpoint torque M_ice_setpoint is output to internal combustion engine 11 from the maximum value selection of a predetermined torque M_ice_specified_normal as a function of requested setpoint torque M_setpoint, and a minimum possible torque of the internal combustion engine in combustion mode M_ice_min_verb is output, either with or without influencing the ignition angle efficiency. Internal combustion engine 11 is thus able to provide an approximation of requested setpoint torque M_setpoint.

For an active overrun request, i.e., B_overrun=true, a setpoint torque M_ice_setpoint=M_ice_specified_overrun is output to internal combustion engine 11 and corresponds to the drag torque of internal combustion engine 11 at the instantaneous rotational speed. In this manner internal combustion engine 11 is converted to overrun mode, and the actual torque of internal combustion engine 11 corresponds to the specified torque.

In this manner the setpoint torque may be obtained for electric motor 12 from the relationship M_mg_setpoint=M_setpoint−M_ice_setpoint.

Thus, if internal combustion engine 11 provides its setpoint torque M_ice_setpoint, and electric motor 12 is able to rapidly adjust its setpoint torque M_mg_setpoint, optimal compensation is provided by this control of the torque jump in the transition from combustion mode to overrun mode.

Furthermore, it is advantageous when the transitions between M_ice_setpoint=MAX (M_ice_specified_normal, M_ice_min_verbr) (i.e., the maximum value selection between M_ice_specified_normal and M_ice_min_verbr) and M_ice_setpoint=M_ice_specified_overrun have a ramped shape. By retardation of the ignition angle, i.e., suppression of individual cylinders of internal combustion engine 11, actual torque M_ice of internal combustion engine 11, in an approximately ramped shape, then tracks ramped-shaped setpoint torque M_ice_setpoint.

Furthermore, when the dynamics are different in the torque control systems of internal combustion engine 11 and electric motor 12, it is advantageous to provide compensation in the control system, for example by specifying the ramp-shaped transition of setpoint torque M_ice_setpoint for internal combustion engine 11 shifted in time with respect to the corresponding transition of setpoint torque M_mg_setpoint for the electric motor. If the torque control for electric motor 12 is performed with greater retardation compared to the torque control for internal combustion engine 11, the control system specifies the ramp-shaped transition of M_mg_setpoint before the corresponding transition of M_ice_setpoint. The time shift is determined on the basis of the dynamic difference in the torque controls.

Figure 4A:
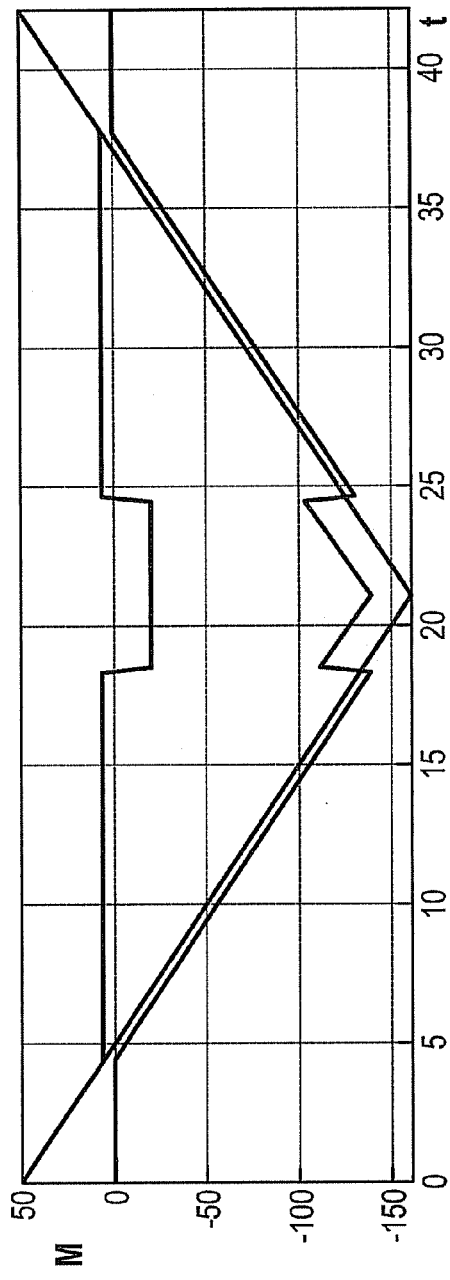
FIGS. 4a, b show a time sequence of an overrun request in which a: the torque varies as a function of time, and b: a Boolean value for the overrun request varies as a function of time.

The sequence of the setpoint torques for internal combustion engine 11 and electric motor 12 over time t is shown as an example in FIG. 4a. The upper curve shows the variation of M_ice_setpoint over time, and the two lower curves show the variation of M_setpoint and M_mg_setpoint over time.

M_ice_setpoint starts with a linear drop, and beginning at t=5 has an essentially constant progression except for a step-shaped drop and subsequent rise at 15<t<25. M_mg_setpoint starts with a constant progression, and at t=5 assumes a linear V-shaped progression with a minimum at approximately t=21, which in the same region increases in a stepped manner at 15<t<25. M_setpoint exhibits a monotonic drop and subsequent rise, with a minimum at t=21.

Figure 4B:
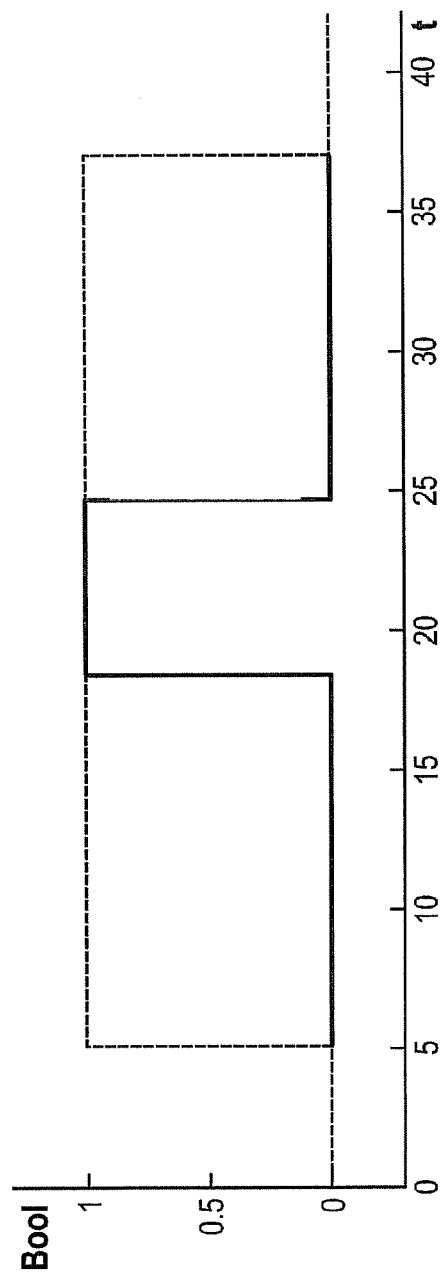

For assumed setpoint torque variation M_setpoint, the lower portion of the illustration (FIG. 4b) shows the variation of B_overrun over time, in addition to the portion of overrun mode B_overrun_previous achieved up to that time for the same setpoint torque variation. It is shown that the duration of the overrun mode is clearly reduced to a corresponding region at 15<t<25.

What is claimed is:

1. A method for operating a vehicle having a hybrid drive, the hybrid drive having an internal combustion engine and at least one electric motor as drive units, the drive units cooperating with one another, the method comprising:

applying, to achieve a negative drivetrain setpoint torque, a negative drivetrain setpoint torque by the electric motor; and operating the internal combustion engine to a greatest extent possible outside its overrun mode;

wherein operating the internal combustion engine to the greatest extent possible outside the overrun mode includes injecting a maximum amount of a fuel into the internal combustion engine so that the internal combustion engine is operated outside its overrun mode;

wherein for generation of an overrun request for the internal combustion engine, a requested drivetrain setpoint torque is compared to a scaled, minimum possible electric motor torque, and wherein a minimum possible electric motor torque is a minimum torque such that an overrun request to the internal combustion engine is not generated.

2. The method according to claim 1, wherein when the compared value is less than a first threshold, an overrun request is generated.

3. The method according to claim 2, wherein the overrun request is maintained for as long as the compared value exceeds a second threshold.

4. A method for operating a vehicle having a hybrid drive, the hybrid drive having an internal combustion engine and at least one electric motor as drive units, the drive units cooperating with one another, the method comprising:

applying, to achieve a negative drivetrain setpoint torque, a negative drivetrain setpoint torque by the electric motor and operating the internal combustion engine to a greatest extent possible outside its overrun mode;

wherein a requested drivetrain setpoint torque is compared to a minimum possible electric motor torque multiplied by an applicable value, and a difference is compared to an upper and a lower threshold value, wherein operating the internal combustion engine to the greatest extent possible outside the overrun mode includes injecting a maximum amount of a fuel into the internal combustion engine so that the internal combustion engine is operated outside its overrun mode, and wherein a minimum possible electric motor torque is a minimum torque such that an overrun request to the internal combustion engine is not generated.

5. The method according to claim 4, wherein the threshold values are a function of at least one of (a) an instantaneous rotational speed and (b) a minimum torque of the internal combustion engine in a combustion mode at at least one of (a) an optimal ignition angle efficiency, (b) a worst ignition angle efficiency, (c) a drag torque of the internal combustion engine, (d) a catalytic converter temperature, and (e) an instantaneously delivered torque of the internal combustion engine.

* * * * *